United States Patent Office 2,945,367
Patented July 19, 1960

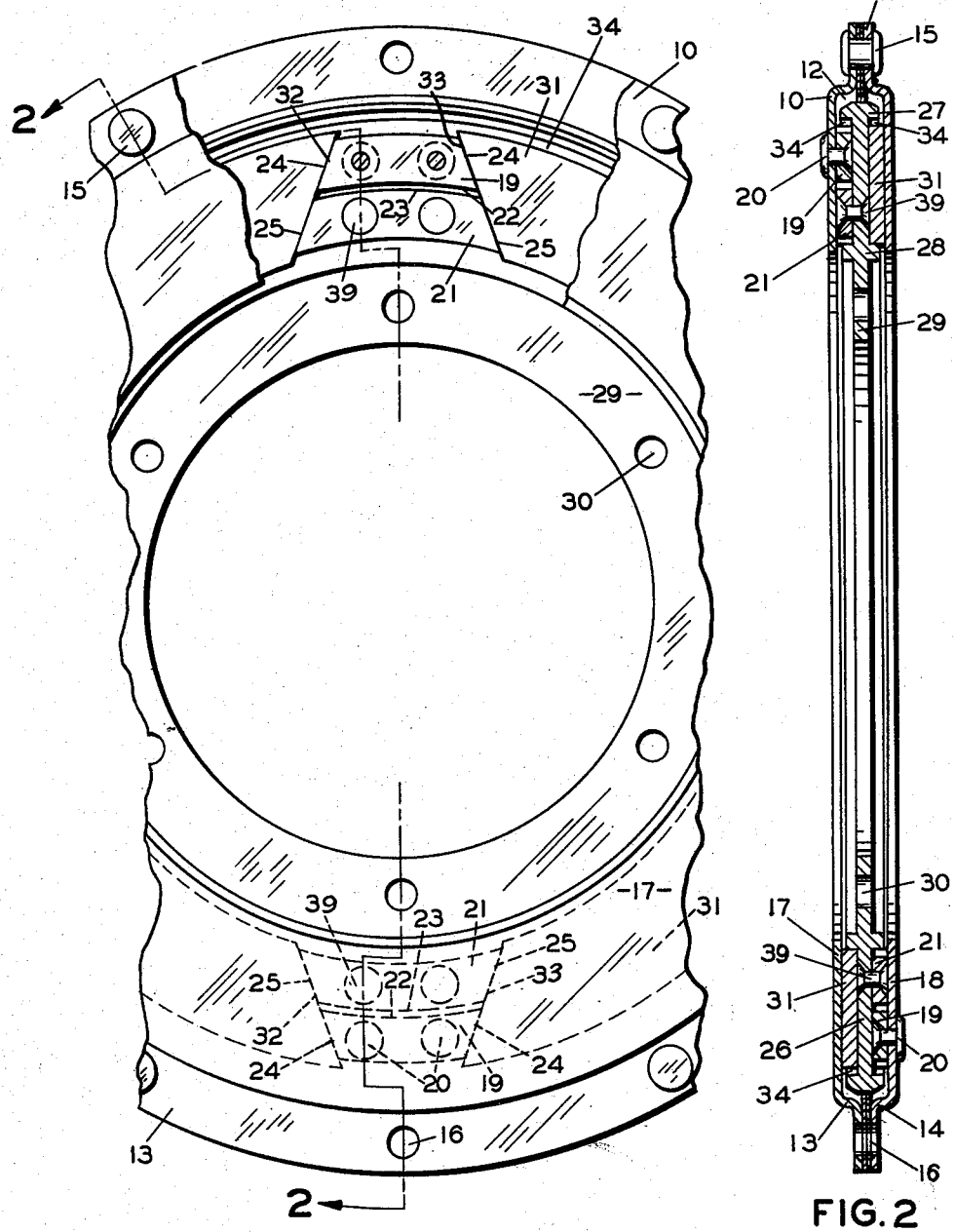

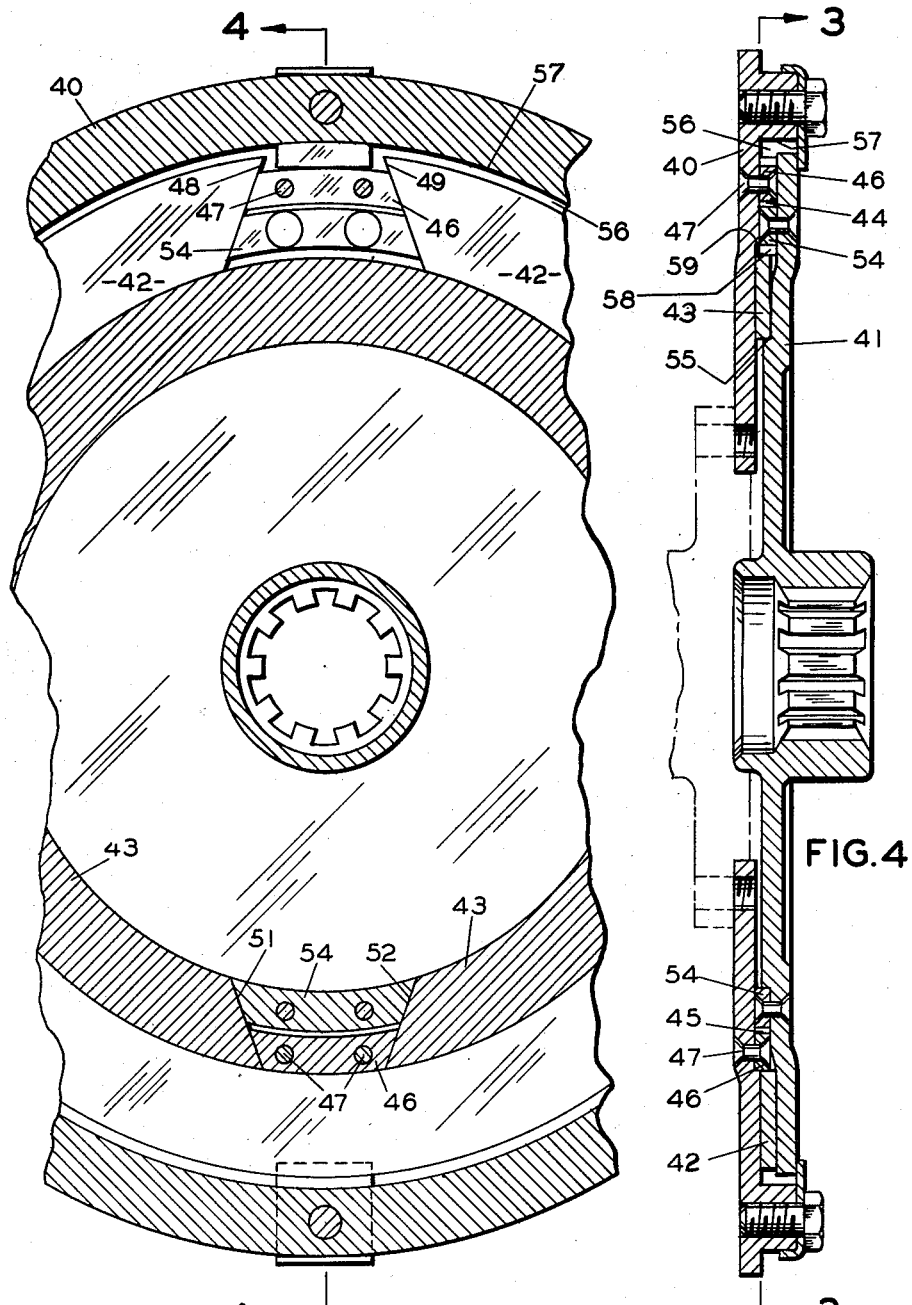

2,945,367

TORSIONAL VIBRATION DAMPENER

William P. Michell, Toledo, Ohio, assignor to Dana Corporation, Toledo, Ohio, a corporation of Virginia Filed June 24, 1958, Ser. No. 744,286

15 Claims. (Cl. 64—27)

This invention relates to torsional vibration dampening means in general, and is particularly directed to resilient vibration dampening means adapted to driveably connect a driving member to a driven member in such a manner that it effectively absorbs impulses and vibrations ordinarily transmitted therebetween.

A primary object of this invention is to provide an improved vibration dampening means including a driving member and a driven member adapted for rotation in the same direction therewith, and further having relative angular movement therebetween about their axis of rotation. A plurality of flexible coupling means are located between the said driving and driven members wherein there is provided a novel relationship of the elements for loading the flexible coupling means in such a manner so as to effect an optimum distribution of the stresses therein. Means are also provided for limiting the amount of expansion of the flexible coupling means whereby the amount of relative angular movement between the driving and driven members is limited, said flexible coupling means operatively connecting said driving and driven members together for unitary rotation. Further means consisting of adjoining pairs of actuators and reaction members are provided one on each of said members for engaging open ends of the flexible coupling means whereby the load on the driving and driven members is uniformly distributed and balanced.

A further object is to provide a structure which is simple in construction, efficient in operation, inexpensive to assemble and manufacture, and occupies a minimum of space.

Further objects and advantages will become apparent upon reading the following specification, together with the accompanying drawings which form a part hereof.

In the drawings:

Fig. 1 is an elevation, with sections partly broken away, showing a self-contained unit embodying the present invention, Fig. 2 is a longitudinal vertical sectional view taken substantially along line 2—2 of Fig. 1 showing a normal relationship between the flexible coupling means and the driving and driven members, Fig. 3 is a transverse sectional view taken substantially along line 3—3 of Fig. 4 of a modified form of the invention which is not in a self-contained unit.

Fig. 4 is a longitudinal vertical sectional view taken substantially along line 4—4 of Fig. 3.

Generally, the invention comprises vibration dampening means consisting of a plurality of similar or like parts which make up in effect an expanding and contracting band, and further which are in the form of split flat rings or washer-like members having free ends arranged edgewise to the axis of rotation of the driving and driven members.

The driving and driven members of the unit are flexibly connected in a driving relation by means of split torsion rings together with means consisting of adjoining pairs of actuating and reaction members one on each of the aforementioned driving and driven members and projecting between the free ends of the said torsion rings. The contacting surfaces of the actuating and reaction members are of such a shape that an improved bearing relation with the free ends of the torsion rings functions to effect a dampening action opposing the abnormal amplitudes of vibration and oscillation at resonant frequencies, as well as the normal vibrations and oscillations.

While the drawings illustrate a flexible coupling unit, embodying the present invention, which has been primarily designed for use in connection with friction clutches and fluid couplings as used in automotive vehicles, it will be obvious that the invention may be adapted to other applications where similar results are desired.

The torsional vibration dampener means is preferably a self-contained unit as is shown in Figs. 1 and 2 comprising a cover, constituting the driving member 10, consisting of a pair of like rings 13 and 14 clamped together at their peripheries to form a circular flange 11. The rings may be secured together as by rivets 15. Annularly spaced holes 16 are provided in the flange 11 for securing the driving member to a friction plate of a clutch, fluid coupling, or other similar device. The rings further are provided with flanges 17 and 18 respectively which are spaced apart to form the opposite walls of a recess 12.

The driving member 10 is provided with a pair of actuating members or lugs 19 attached thereto as by rivets 20. The members 19 are disposed one on each of the inner sides of the flanges 17 and 18 diametrically opposite each other and projecting axially inwardly for alignment with reaction members 21, but further outward radially, in spaced relation thereto. The actuating and reaction members 19 and 21 respectively are of similar shape, the adjoining sides 22 and 23 being arcuately curved by a radius, the center of which is the axis of rotation of the assembly sloping or tapering ends 24 and 25 are provided on actuating and reaction members 19 and 21 as shown in Fig. 1, the function of which will be discussed in detail hereinafter.

A drive hub of a suitable device, constituting the driven member 26 of the unit, is provided with a plurality of radially spaced circumferential walls 27 and 28 extending in an axial direction on both sides thereof and a centrally disposed annular flange 29. The flange 29 is provided with annularly spaced holes 30, as is shown in Fig. 1, or can be splined or otherwise formed for connecting the driven member to any suitable element. The outer-most circumferential wall or abutment 27 serving to limit the amount of expansion of the torsion rings 31 thus controlling the amount of relative arcuate movement between the cover 10 and the drive hub 26. This construction is considered important since it provides a positive drive when the torsion rings 31 are expanded against the abutments 27 whereby the maximum loaded condition of the torsion rings 31 is predetermined. The inner annular abutments 28 serve to hold the torsion rings 31 or flexible coupling means concentrically about the axis of rotation of the unit. The driven member 26 is provided with the aforementioned reaction members or lugs 21 which are riveted thereto at 39. The lugs 21 are disposed diametrically opposite each other, one on each side of the driven member 26 and between the circumferential walls 27 and 28. The reaction members 21 also project axially outwardly from the driven member 26. The driven member 26 extends into the annular recess 12 of the driving member 10, the purpose of which will be discussed in conjunction with the flexible drive means.

As shown in Fig. 1, a pair of torsion rings 31, constituting the flexible coupling means, are arranged one on each side of the driven member 26 and are disposed edgewise to and between the circumferential walls 27 and 28 thereof. The torsion rings 31 further have free ends 32 and 33 relatively spaced apart and are made of thin flat material of substantially equal thickness. The rings are formed to tightly encircle the inner circumferential walls 28 of the driven member 26. The free ends 32 and 33 of the torsion rings 31 are engageable with the adjacent sloping ends 24 and 25 of the actuating and reaction members 19 and 21 respectively which are provided with a similar contour. The degree of slope or tapering between the ends 24 and 25 of the actuating and reaction members 19 and 21 and the complementary ends 32 and 33 of the torsion rings 31 is important as it controls the spreading apart of the said torsion rings 31. The degree of taper is determined by the relationship of the diameter of the torsion rings 31 to the amount of clearance 34 available for the expansion of the rings 31 whereby the rings 31 will retain a substantially circular shape throughout their range of expansion, thus effecting an optimum distribution of the stresses therein.

The torsion rings 31 are split, or divided, and there is sufficient clearances 34 between the outer circumferential wall 27 and the outer periphery of the torsion rings 31 to permit the torsion rings 31 to have an expanding action of varying force. The torsion rings 31 are of such a thickness and are so arranged in relation to the driving and driven members 10 and 26 respectively that they are held from axial displacement by the said driving and driven members 10 and 26. If friction lag is desired between the drive and driven members, the amount of the friction lag is determined in the above construction by selection of the appropriate number of shims placed between the rings 11 of the driving member 10.

Referring to Fig. 1, it is to be seen that while the torsion rings 31 are expanding they will substantially retain their circular form and the exterior surfaces of the said rings will be in uniform compression while the interior surface will be in uniform tension, the neutral axis being the median plane of the torsion rings.

It is important to note in this connection that as a still further assurance of effecting the optimum distribution of stresses in the torsion rings the end surfaces 32 and 33 of the said torsion rings 31 are made to assume a substantially full surface contact with the complementary surfaces 24 and 25 of the actuating and reaction members 19 and 21 both in the neutral or line position of these last said members and in the position of maximum displacement.

The balanced load effect is obtained by positioning the free ends 32 and 33 of the torsion rings diametrically opposite to each other so as to engage the adjacent sloping sides 24 and 25 of the actuator and reaction members, or lugs, 19 and 21, respectively.

It will be apparent that opposite relative arcuate movement between the driving and driven members 10 and 26 will cause the actuator and reaction members, or lugs, 19 and 21, to move in opposite directions, thus effecting the spreading apart of the open ends 32 and 33 of the torsion rings 31, loading the rings 31 and tending to cause the aforementioned members to rotate in the same direction, thus dampening the impulses and vibrations ordinarily transmitted therebetween. This unit is versatile as to the conditions under which it is to function as torsion rings can be added or subtracted from the unit, whereby the dampening effect can be increased or decreased as is desired.

In operation of the unit with the elements thereof in their relative positions as shown in the drawings and assuming the driven member 26 to be stationary, angular movement of the drive member 10, in a clockwise direction, causes the actuator members or lugs, 19 and 21 to move to the right which movement in turn is flexibly resisted by the adjacent free ends 32 and 33 of the torsion rings 31. The resiliency of the torsion rings 31 affords a flexible driving connection, and by arranging the torsion rings 31 diametrically opposite a flexible balanced drive is provided between the driving member 10 and the driven member 26. The torque supplied to the said torsion rings 31 tends to expand them and hence take up the clearance 34 between the outer periphery of the torsion rings 31 and the circumferential walls 27 of the driven member 26. The amount of expansion is in proportion to the driving force applied, hence, shocks or vibrations due to the starting or sudden acceleration of the members and to the firing or explosions of the engine cylinders are absorbed, or dampened by the torsion rings 31 while expanding. It is to be further noted that the coupling will work with equal efficiency if the driven member 26 becomes the drive member 10. The torsion rings 31 may be pre-loaded slightly if the requirements so dictate.

As seen in Figs. 3 and 4, instead of providing the unit with separate driving and driven members as is shown in the preferred embodiment, the driving and driven elements 40 and 41 of a suitable mechanism are adapted to directly receive torsion rings 42 and 43 in recesses 44 and 45 provided therein. The recesses 44 and 45 are provided with actuating members, or lugs, 46 which are riveted at 47 or otherwise secured therein and are disposed diametrically opposite and project axially outwardly for mating with free ends 48 and 49 of the torsion ring 42 and the free ends 51 and 52 of the torsion ring 43.

The driven element 41 is provided with reaction members, or lugs, 54 inward radially and in spaced relation to the actuating members 46 of the driving element 40. The said reaction members 54 project axially inward for cooperation with the aforesaid actuating members 46 and also engage the free ends 48 and 49 of the torsion ring 42 and the free ends 51 and 52 of the torsion ring 43.

The torsion rings are of different diameters and can be either nested together in a common plane perpendicular to the axis of rotation or axially spaced apart as is shown in the Fig. 4. The inner torsion ring 43, as shown in Figs. 3 and 4 is formed to tightly encircle an annular abutment 55 which is provided on the driven member 41. The outer torsion ring 42 is formed to tightly encircle the outer periphery of the inner torsion ring 43. Sufficient clearance 56 is provided between the outer periphery of the larger torsion ring 42 and the annular abutment 57 provided on the driving member 40 so that it permits the said torsion ring 42 to have an expanding action of varying force. As the outer or larger torsion ring 42 expands, the inner torsion ring 43 is permitted to expand as the increase in torque so dictates. Clearance is also provided at 58 between the outer periphery of the inner ring 43 and an abutment 59 in the driving member 40. Thus, each ring 42 and 43 is provided with an annular abutment to control the limit of travel or outward expansion of the rings which also limits the stresses induced therein to a safe value.

In this form of the invention, the balanced load effect is obtained in the following manner; the tangential forces applied to the drivers 46 by the torsion rings 42 and 43 are so calculated that they result in a balanced tangential load. The inner and outer torsion rings 43 and 42 are made of the same thickness of material and it will be noted that the outer torsion ring 42 will be softer than the inner torsion ring 43, due to its greater diameter. Therefore, a correspondingly lesser force is exerted by the outer actuator 46 of the driving member 40, and a correspondingly lesser force, due to the greater radius, is necessary to maintain a balanced load between the driving and driven elements 40 and 41.

In both forms of the invention improved means have been provided for using multiple torsion rings wherein the tangential loads are balanced. Also, improved means are provided for compensating for friction at the ends of the torsion rings and the complementary ends of the drivers.

From an operational standpoint the dampening action of the torsion rings are preferred because they are more sensitive and better adapted for subduing torque vibration than other types of springs.

From a manufacturing standpoint, the torsional ring dampening means can be very economically made and quickly assembled in any given application.

It will be obvious that various changes in the details, which have been herein described and illustrated in order to explain the nature of this invention, may be made by those skilled in the art within the principles and scope of the invention as expressed in the appended claims.

What is claimed is:

1. A vibration dampening means comprising, a driving member, a driven member adapted for rotation in the same direction with said driving member, said members having relative angular movement about their axis of rotation, a plurality of flexible coupling means, annular abutment means on at least one of said members defining a plurality of annular spaces for individually receiving said flexible coupling means for limiting the amount of expansion of the flexible coupling means whereby the amount of relative angular movement between the said driving and driven members is limited, said flexible coupling means operatively connecting said driving and driven members together for unitary rotation, a plurality of adjoining pairs of lugs one of each pair on each of said members for relative angular movement, said flexible coupling means having free ends in engagement with adjacent sides of the aforementioned lugs whereby the load on the driving and driven members is uniformly distributed and balanced.

2. A vibration dampening means according to claim 1 in which one of the adjoining pairs of lugs is disposed in a common plane perpendicular to the axis of rotation and further outward radially than the other adjoining pairs of lugs.

3. A vibration dampening means comprising, a driving member, a driven member adapted for rotation in the same direction with said driving member, said members having relative angular movement about their axis of rotation, radially spaced annular abutment means formed on at least one of said members defining a plurality of annular spaces, a pair of radially opposed lugs one on each member projecting radially outwardly from one side of their axis, a second pair of radially opposed lugs one on each member projecting radially outwardly from the opposite side of their axis, a split flat torsion ring disposed in each of said annular spaces, said flat torsion rings having free ends in engagement with adjacent sides of said lugs, whereby the load on the driving and driven members is uniformly distributed and balanced.

4. A vibration dampening means according to claim 3 in which the second pair of lugs is disposed farther outward radially than the first lugs.

5. A vibration dampening means comprising, a driving member, a driven member adapted for rotation in the same direction with said driving member, said members having relative angular movement about their axis of rotation, radially spaced annular abutment means formed on one of said members defining a plurality of annular spaces, a pair of radially opposed actuating and reaction members on the driving and driven members respectively projecting radially outwardly from one side of their axis of rotation, a second pair of radially opposed actuating and reaction members on the driving and driven members respectively projecting radially outwardly from the opposite side of their axis of rotation, a flat torsion ring disposed in each of said annular spaces, said flat torsion rings being split and having free ends in engagement with adjacent sides of said actuating and reaction members, whereby the load on the driving and driven members is uniformly distributed and balanced.

6. A vibration dampening means according to claim 5 in which the driving member includes spaced circumferential abutments forming flanges to limit the amount of expansion of the said torsion rings.

7. A vibration damping means comprising, a driving member, a driven member adapted for rotation in the same direction with said driving member, said members having a limited amount of opposite relative angular movement about their axis of rotation, radially spaced annular abutment means formed on at least one of said members defining a plurality of annular spaces, a plurality of flexible coupling means, a set of radially opposed elements consisting of an actuating member secured to said driving member, a reaction member secured to said driven member, and further extending between free ends of the said flexible coupling means on one side of their axis of rotation, a second set of radially opposed elements consisting of a second actuating member secured to said driving member, a second reaction member secured to said driven member, and further extending between free ends of a second flexible coupling means on the other side of their axis of rotation, said flexible coupling means consisting of a split flat torsion ring disposed in each of the said annular spaces, said split flat torsion ring having its free ends in engagement with the adjacent sides of the said actuating and reaction members, whereby the load on the said driving and driven members is uniformly distributed and balanced.

8. A vibration dampening means according to claim 7 in which one of the sets of actuating and reaction members are disposed further outward radially than the said other set and further are located in a common plane perpendicular to the axis of rotation.

9. A vibration dampening means comprising, a driving member, a driven member adapted for rotation in the same direction with said driving member, said members having relative angular movement about their axis of rotation, and a plurality of flexible coupling means operatively connecting said members together for rotation including, a pair of radially opposed lugs one on each member projecting axially inwardly and outwardly respectively on one side of their axis of rotation, a second pair of radially opposed lugs one on each member projecting axially inwardly and outwardly respectively on the opposite side of their axis of rotation, said flexible coupling means consisting of a duplicate pair of split flat torsion members, one of said torsion members having free ends in engagement with the adjacent sides of first said lugs, and the second said torsion member having its free ends in engagement with the adjacent sides of the said second set of lugs, whereby the load on the driving and driven members is uniformly balanced and distributed.

10. A vibration dampening means according to claim 9 in which the flexible coupling means and the radially opposed lugs are disposed on opposite sides of the driven member.

11. A vibration dampening means according to claim 1 in which the degree of taper of the free ends of the torsion rings and the complementary side of the lugs are in such a relationship that during the expansion of the said rings, the said rings will retain a substantially circular shape thus effecting an optimum distribution of the stresses therein.

12. A vibration dampening means according to claim 5 in which the free ends of the torsion rings and the complementary surfaces of the actuating and reaction members both lie in a neutral or line position and maintain a substantially full surface contact during maximum displacement of said torsion rings.

13. A vibration dampening means comprising, a driving member, a driven member adapted for rotation in the same direction with said driving member, said members having relative angular movement about their axis of rotation, expendable flexible coupling means provided with free ends operatively connecting said driving member to said driven member for unitary rotation, annular abutment means on at least one of said members adapted for engagement with said flexible coupling means for limiting the expansion thereof, thereby limiting the angular movement between said driving and driven members, radially opposed actuating means having a spaced relationship to each other on each of said members, said actuating means having opposed sides in engagement with the free ends of the said coupling means, thereby uniformly distributing and balancing applied loads between the said driving and driven members during periods of relative angular movement therebetween.

14. A vibration dampening means according to claim 13 wherein the driving member is provided with an annular recess, a wall of which is the annular abutment means for limiting the relative angular movement between the driving and driven members.

15. A vibration dampening means according to claim 13 wherein the driven member is provided with an annular recess, a wall of which is the annular abutment means for limiting the relative angular movement between the driving and driven members.

References Cited in the file of this patent

UNITED STATES PATENTS

| | | |
|---|---|---|
| 1,495,207 | Rybeck | May 27, 1924 |
| 1,956,798 | Janssen | May 1, 1934 |
| 2,425,539 | Johnson | Aug. 12, 1947 |

FOREIGN PATENTS

| | | |
|---|---|---|
| 423,278 | Great Britain | Jan. 29, 1935 |